United States Patent
Carl et al.

(10) Patent No.: US 9,889,389 B2
(45) Date of Patent: Feb. 13, 2018

(54) ROTARY EVAPORATOR

(71) Applicant: HANS HEIDOLPH GMBH, Kelheim (DE)

(72) Inventors: Joachim Carl, Stein (DE); Maximilian Bayer, Abenberg (DE); Walter Lohmann, Wendelstein (DE)

(73) Assignee: HANS HEIDOLPH GMBH, Kelheim (DE)

( * ) Notice: Subject to any disclaimer, the term of this patent is extended or adjusted under 35 U.S.C. 154(b) by 0 days.

(21) Appl. No.: 15/309,623

(22) PCT Filed: Apr. 29, 2015

(86) PCT No.: PCT/EP2015/059346
§ 371 (c)(1),
(2) Date: Nov. 8, 2016

(87) PCT Pub. No.: WO2015/169664
PCT Pub. Date: Nov. 12, 2015

(65) Prior Publication Data
US 2017/0151508 A1 Jun. 1, 2017

(30) Foreign Application Priority Data

May 9, 2014 (DE) .......................... 10 2014 106 553

(51) Int. Cl.
*B01L 9/04* (2006.01)
*B01D 3/08* (2006.01)
*F16M 11/04* (2006.01)

(52) U.S. Cl.
CPC ............... *B01D 3/085* (2013.01); *B01L 9/04* (2013.01); *F16M 11/043* (2013.01)

(58) Field of Classification Search
CPC ........... B01D 3/085; B01L 9/04; F16M 11/04; F16M 11/043
See application file for complete search history.

(56) References Cited

U.S. PATENT DOCUMENTS 1,457,825 A * 6/1923 Devan ...................... B66F 3/10
254/102
3,342,696 A * 9/1967 Bush ...................... B01L 3/569
159/18
(Continued)

FOREIGN PATENT DOCUMENTS

DE 9204701 U1 6/1992
DE 4319498 A1 11/1994
(Continued)

OTHER PUBLICATIONS

International Preliminary Report on Patentability in PCT/EP2015/059346, dated Nov. 10, 2016.

*Primary Examiner* — Jonathan Miller
(74) *Attorney, Agent, or Firm* — Wiggin and Dana LLP; Gregory Rosenblatt; Andrew Bochner

(57) ABSTRACT

A rotary evaporator is provided. The rotary evaporator includes a rotary drive and a piston support (11) for an evaporator piston which can be coupled to the rotary drive. The piston support (11) comprises two transverse carriers (19, 21) for supporting the evaporator piston at two support regions spaced apart from one another and a longitudinal guide (25) having a guide element (27), on which longitudinal guide the two transverse carriers (19, 21) are moveably arranged in order to vary the mutual spacing of the two transverse carriers (19, 21). The guide element (27) is displaceably guided in the longitudinal direction (23) in order to displace the evaporator piston between a coupling position with the rotary drive and a position spaced back from the rotary drive.

19 Claims, 4 Drawing Sheets

(56) References Cited

U.S. PATENT DOCUMENTS

| | | | | |
|---|---|---|---|---|
| 3,461,040 | A | * | 8/1969 | De Ros ............... G01N 25/14 196/112 |
| 5,337,806 | A | | 8/1994 | Trunner |
| 5,639,354 | A | | 6/1997 | Zellweger |
| 5,919,339 | A | * | 7/1999 | Ikeda ................. B01D 3/085 202/189 |
| 2012/0120757 | A1 | * | 5/2012 | Deal ................... B01F 7/1695 366/343 |
| 2014/0238621 | A1 | * | 8/2014 | Hauser ............... B01D 3/085 159/11.1 |

FOREIGN PATENT DOCUMENTS

| | | |
|---|---|---|
| DE | 102009010363 A1 | 8/2010 |
| EP | 0641582 A1 | 3/1995 |
| WO | 2004/039471 A1 | 5/2004 |

\* cited by examiner

ROTARY EVAPORATOR

FIELD OF THE INVENTION

The present invention relates to a rotary evaporator having a rotary drive.

BACKGROUND OF THE INVENTION

A rotary evaporator is a laboratory apparatus which typically comprises a heating bath and an evaporator flask which can dip into the heating bath. In operation, a liquid medium present in the heating bath, for example water or—for higher temperatures—oil, is heated in order thus to heat the evaporator flask dipped into the heating bath. A mixture, in particular a liquid mixture, contained in the evaporator flask can hereby be heated so that the respective distillate, in particular solvent, is evaporated. The evaporated distillate then flows into a cooler of the rotary evaporator to condense there. The condensate is subsequently collected in a collection flask. The distillation residue remaining in the evaporator flask can be further processed or analyzed. A vacuum pump is frequently additionally provided for the generation of a vacuum in the evaporator flask and in the cooler to lower the boiling point, whereby the distillation can be accelerated and the distillation rate can be increased. A heating bath is, however, not absolutely necessary. An evaporation can, for example, also be effected solely by generating a vacuum. A heating dish, a heating mantle or a heating quiver can e.g. also be used instead of a heating bath.

A rotary evaporator furthermore comprises a rotary drive to rotate the evaporator flask in the heating bath or in the respective heating medium. The evaporator flask is uniformly heated due to the rotation and a thin liquid film is produced at the heated inner wall of the evaporator flask which has a large surface and from which the distillate can be evaporated fast, efficiently and gently.

It is known to couple the evaporator flask to the rotary drive of the rotary evaporator using a kind of retainer nut or using a clamping mechanism. The coupling or fastening of above all large evaporator flasks, in particular then they are filled, however, often presents the user with difficulties since it is necessary for the respective fastening to position the flask neck of the evaporator flask sufficiently exactly at the rotary drive to be able to actuate the respective fastening mechanism. The release of the evaporator flask is occasionally also correspondingly difficult.

BRIEF SUMMARY OF THE INVENTION

It is an object of the invention to provide a rotary evaporator of the initially named kind that makes the fastening and release of the evaporator flask respectively to or from the rotary drive as simple as possible for the user.

The object is satisfied by a rotary evaporator having the features of claim 1 and in particular in that a flask support for an evaporator flask couplable to the rotary drive is provided. The flask support comprises two cross members for supporting the evaporator flask at two mutually spaced apart support regions and a longitudinal guide that has a guide element and at which the two cross members are arranged in a travelable manner, in particular in a displaceable manner, to vary the mutual spacing of the two cross members, with the guide element being displaceably guided in the longitudinal direction to displace the evaporator flask between a coupling position with the rotary drive and a position set back or remote from the rotary drive. The guide element can, for example, be a guide rail, a guide shaft or a threaded spindle.

The flask support bears the weight of the evaporator flask so the user is hereby relieved. It is made possible for the user to adapt the flask support to all conventional or customary flask sizes by the possibility of varying the spacing between the two cross members. The displaceable guide element furthermore makes it possible that the two cross members are displaceable together while maintaining their mutual spacing. Due to this displacement possibility, the user can move the flask neck of the evaporator flask in a simple manner and at least substantially without force exertion toward the rotary drive and the respective fastening mechanism and can position it there for fastening the evaporator flask to the rotary drive. The release of the evaporator flask from the rotary drive is also hereby facilitated. If the fastening mechanism is released, the evaporator flask can be borne by the flask support and can thus be removed without any great effort by a mere displacement from its coupling position at the rotary drive. The operating comfort of the rotary evaporator can thereby be considerably increased overall.

The following in particular applies: The longitudinal guide extends in the longitudinal direction; the longitudinal direction corresponds to the direction of the longitudinal guide; the longitudinal guide is a linear guide; the two cross members extend transversely, in particular perpendicular to the longitudinal direction; the two cross members extend in parallel with one another; and/or the two cross members are spaced apart from one another.

The guide element is preferably only displaceably guided in a horizontal direction. The evaporator flask is thus also only travelable in the horizontal. It is, however, generally also possible that the guide element is displaceably guided in a direction inclined with respect to the horizontal.

The guide element is preferably slidingly guided. In a particularly simple sliding guide, the mutually corresponding guide elements are not separated from one another by rolling elements. The sliding guide can, however, generally also have such rolling elements.

In accordance with an embodiment of the invention, the guide element is preloaded in the direction of the coupling position of the evaporator flask by means of as spring device. An unintentional displacement of the evaporator flask from its coupling position in which the evaporator flask can be fastened to the rotary drive of the rotary evaporator can be prevented by the spring device. In addition, it can be achieved by the spring support that the evaporator flask is always pressed against the rotary drive—also while the fastening mechanism of any kind is actuated—which simplifies the fastening of the evaporator flask to the rotary drive.

The guide element can be displaceable by a displacement distance of at least 20 mm, preferably at least 40 m, and/or of at most 120 mm, preferably at most 100 mm. The coupling position and the position set back from the rotary drive can be at least 20 mm, in particular at least 40 mm, and/or at most 120 mm, preferably at most 100 mm, remote from one another.

In accordance with a further embodiment of the invention, the two cross members can be fixed by means of a respective fixing device to the guide element of the longitudinal guide. The respective fixing device is preferably configured as a latching device and the two cross members are latchable to the guide element at a respective at least two, preferably at least three, different latching positions. In the latched state, the cross members can then no longer be displaced along the longitudinal guide. The latch positions preferably comprise loading positions that are selected such that the spacings of the support regions defined by them are matched to different evaporator flasks having different predefined dimensions or standard dimensions, for example 6 l, 10 l, 20 l. It is, however, generally also possible that the cross members are fixed to the guide element via clamping screws or the like.

The features associated with the latching device can also be implemented independently of the above-explained displaceable guide element. The present invention therefore also relates to a rotary evaporator having a rotary drive and having a flask support for an evaporator flask couplable to the rotary drive, wherein the flask support comprises two cross members for supporting the evaporator flask at two mutually spaced apart support regions and a longitudinal guide at which the two cross members are arranged in a travelable manner to vary the mutual spacing of the two cross members, wherein the two cross members can be fixed to the guide element of the longitudinal guide by means of a respective fixing device, and wherein the respective fixing device is configured as a latching device and the two cross members are latchable to the guide element at at least two, preferably at at least three, different latching positions.

A latching groove, in particular in the form of an annular groove, can be provided at the guide element at the respective latching position, in particular at the loading position and/or parking position, for latching the respective cross member to the guide element and a latch projection associated with the respective cross member and movable between a position securing the latched connection and a position releasing the latched connection engages into said latch groove. The respective latch projection can e.g. be configured as a latch bolt.

It is preferred in this respect if the respective latch projection is preloaded into the position securing the latched connection. If the respective cross member is displaced along the guide element, the latch projection automatically latches into the latch groove as soon as the cross member travels over a latch position. Provision can additionally or alternatively be made that the respective latch projection is manually movable into the position releasing the latched connection via a respective actuation section accessible for a user, in particular movable against a preload.

The traveling of the two cross members or the setting of the mutual spacing of the two cross members can, however, also take place by means of a helical gear transmission or of a spindle drive. In this respect, the guide element can be configured as a threaded spindle having a first threaded section with a left hand thread or a right hand thread and having a second threaded section with a thread running opposite thereto, wherein the first cross member is supported displaceably and rotationally fixedly on the first threaded section via a corresponding first mating thread and the second cross member is supported displaceably and rotationally fixedly on the second threaded section via a corresponding second mating thread. A rotary movement of the threaded spindle, for example by a motor or by a crank, can be converted into longitudinal movements of the two threaded sections and thus of the two cross members toward or away from one another by the helical gear transmission. The mutual spacing of the two cross members can be continuously adjusted in this respect.

The features associated with the helical gear transmission can also be implemented independently of the above-explained displaceable guide element. The present invention therefore also relates to a rotary evaporator having a rotary drive and having a flask support for an evaporator flask couplable to the rotary drive, wherein the flask support comprises two cross members for the support of the evaporator flask at two mutually spaced apart support regions and comprises a longitudinal guide at which the two cross members are arranged in a travelable manner to vary the mutual spacing of the two cross members, wherein the displacement of the two cross members takes place by means of a helical gear transmission or by means of a spindle drive.

In accordance with a further embodiment of the invention, the longitudinal guide comprises, in addition to the displaceably guided guide element, at least one further guide element extending in parallel with said displaceably guided guide element and arranged in a fixed location. The longitudinal guide can in particular be configured as a double linear guide having two mutually spaced apart guide elements.

Each of the two cross members is preferably provided with a respective carriage at its two ends, with the respective cross member being arranged in a travelable manner via the two carriages at the two guide elements. The guide elements can be configured as round bars. The carriages can be provided with cylindrical passages of counter-shape to the round bars. The longitudinal guide can generally be a carriage guide.

A respective support element, in particular a support roller, for the evaporator flask can be attached to the two cross members. The support element can have a double-conical shape. The axis of the double cone in particular extends in a transverse direction or in the direction of the longitudinal extent of the cross members. The evaporator flask can be held secure against rolling on the flask support by support elements shaped in this manner.

The flask support can have a substructure that bears the longitudinal guide. A heating bath can be provided that is arranged in the substructure beneath the flask support. The flask support can be fixedly connected to the other rotary evaporator.

The invention further relates to a flask support for an evaporator flask that is couplable to a rotary drive of a rotary evaporator and that comprises two cross members for supporting the evaporator flask at two mutually spaced apart support regions and a longitudinal guide that has a guide element and at which the two cross members are arranged in a travelable manner, in particular a displaceable manner, to vary the mutual spacing of the two cross members, wherein the guide element is displaceably guided in the longitudinal direction to displace the evaporator flask between a coupling position with the rotary drive and a position set back from the rotary drive.

Advantageous embodiments of the flask support in accordance with the invention result in an analog manner from the embodiments described above with respect to the rotary evaporator in accordance with the invention. The features associated with the aforesaid latching device and/or the features associated with the aforesaid helical gear transmission can in particular also again be implemented independently of the displaceable guide element.

Further developments of the invention are also set forth in the dependent claims, in the description and in the enclosed drawings.

BRIEF DESCRIPTION OF THE SEVERAL VIEWS OF THE DRAWINGS

The invention will be described in the following by way of example with reference to the drawings. There are shown, FIG. 1 a flask support in accordance with the invention of a rotary evaporator having cross members latched in a parking position and having a guide element located in a coupling position.

DETAILED DESCRIPTION OF THE INVENTION

Figure 1:
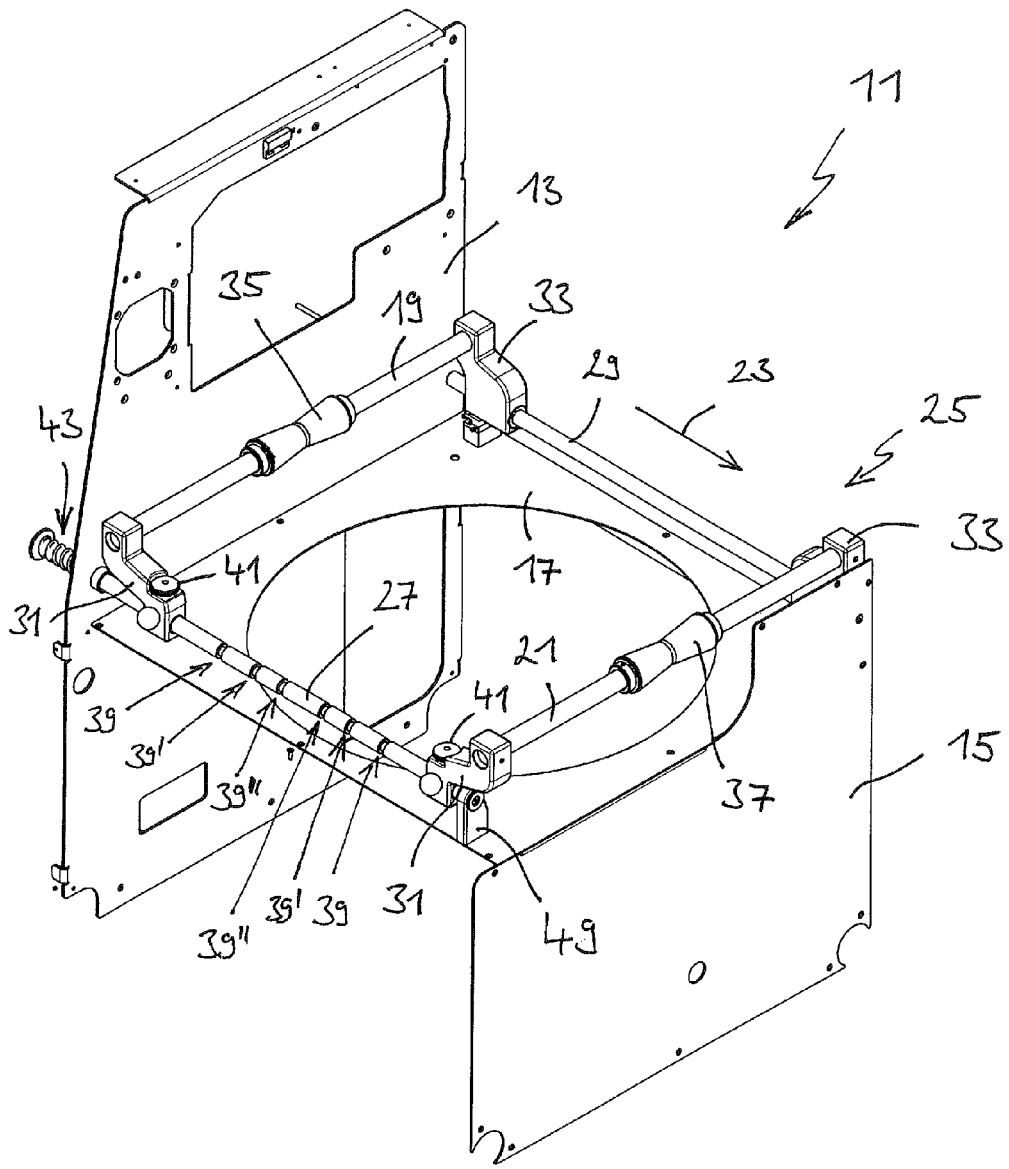

The flask support 11 shown in FIG. 1 of a rotary evaporator not otherwise shown comprises two side walls 13, 15 of which the higher side wall 13 faces the rotary drive of the rotary evaporator. The two side walls 13, 15 are connected to one another at the level of the upper end of the lower side wall 15 via a plate 17 having a central, circular opening. A heating bath, not shown, of the rotary evaporator is arranged between the two side walls 13, 15 and beneath the plate 17 and an evaporator flask borne by the flask support 11 and coupled to the rotary drive of the rotary evaporator can partly dip into it. To couple the evaporator flask to the rotary drive, the flask neck of the evaporator flask is fastened to the hub of the rotary drive, with this fastening taking place through a rectangular opening formed in an upper section of the side wall 13.

The middle and lower sections of the side wall 13, the plate 17 and the side wall 15 form a substructure of the flask support 11 on which two cross members 19, 21 are arranged. The two cross members 19, 21 are provided with a respective double conical support roller 35, 37 at the center on which the evaporator flask is supported. The two cross members 19, 21 are arranged respectively displaceable along a longitudinal direction 23 such that the mutual spacing of the two cross members 19, 21 can be varied. For this purpose, a linear guide 25 is provided that extends horizontally and in the longitudinal direction 23 and that has two guide shafts 27, 29 that extend in parallel with one another, that are formed as round bars and that form the guide elements of the linear guide 25. The guide shafts 27, 29 can generally also be configured as multi-sided shafts. The two cross members 19, 21 are guided on the two guide shafts 27, 29 in a travelable manner via carriages 31, 33 attached to their respective two ends and configured in the manner of two bearing bushings.

Since the mutual spacing of the two cross members 19, 21, and thus the mutual spacing of the two support regions at which the evaporator flask is supported, is variable, the flask support 11 can be adapted to evaporator flasks of different dimensions. To lock the cross members 19, 21 at respective correspondingly predefined loading positions at the linear guide 25, one of the two guide shafts 27, 29, the guide shaft 27 in the embodiment shown, has a respective three annular grooves 39, 39', 39" for each of the two cross members 19, 21 into which a respective latch bolt of a fixing device formed as a latching device 41 and integrated in a respective carriage 31 can engage.

The two cross members 19, 21 are latched in the respective outer annular grooves 39 associated with the loading positions for a first large flask size (cf. FIGS. 2 and 3); in the respective middle annular grooves 39' for a second, medium flask size; and in the respective inner annular grooves 39" for a third, small flask size. A respective annular groove 38 is furthermore provided that corresponds to a respective parking position of the cross members 19, 21 (cf. FIG. 1). The latch bolts are in this respect preloaded into the position securing the latched connection, i.e. the position in which they engage into the annular grooves 38, 39, 39', 39", by means a corresponding respective spring, not shown. The latch bolts are each provided at the ends disposed opposite the ends engaging into the annular grooves 38, 39, 39', 39" with an actuation section that projects out of the respective carriage 31 and with which the respective latch bolt is manually movable against the preload of the respective spring into a position releasing the latched connection.

Figure 2:
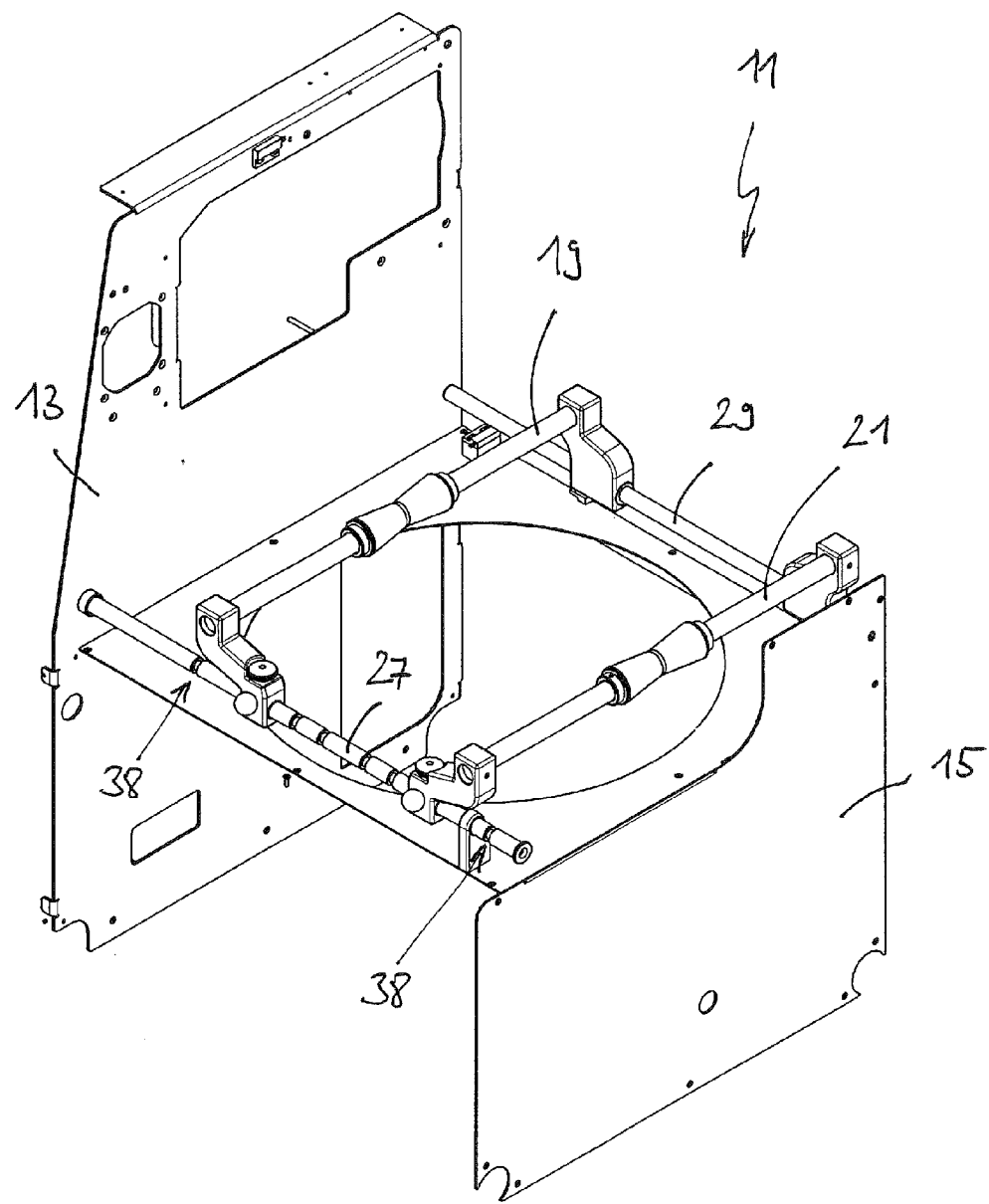
FIG. 2 the flask support of FIG. 1, with the cross-members being latched in a loading position and the guide element being located in a set back position.

The guide shaft 29 is fixedly connected to the substructure of the flask support 11, whereas the guide shaft 21 provided with the annular grooves 38, 39, 39', 39" is displaceable in the longitudinal direction 23 between a first position (cf. FIGS. 1 and 3) and a second position (cf. FIG. 2). The guide shaft 27 is in this respect guided at the one end in the side wall 13 and at the other end in a bearing block 49 attached to the plate 17. The maximum displacement distance of the guide shaft 27 can, for example, amount to between 20 and 80 mm, in particular between 40 and 60 mm, and preferably to approximately 50 mm.

The two cross members 19, 21, and thus also an evaporator flask located on the cross members 19, 21, are also displaced with the guide shaft 27 between the first position and the second position. The first position displaced in the direction of the rotary drive corresponds to a coupling position in which the evaporator flask is led toward the rotary evaporator to be coupled to the rotary drive there. The second position displaced away from the rotary evaporator corresponds to a loading position in which the evaporator flask can be placed onto or removed from the flask support 11 without the risk of an abutment at the rotary drive.

The guide shaft 27, and thus the two cross members 19, 21, are preloaded in the direction of the coupling position by means of a compression spring 43. The guide shaft 27, and with it the two cross members 19, 21, are thus always in the coupling position in the operation of the rotary evaporator, i.e. during distillation. An unintentional displacement of the guide shaft 27 or of the cross members 19, 21 can furthermore be at least largely prevented by the spring 43.

To fasten an evaporator flask of large size to the rotary drive of the rotary evaporator, the two cross members 19, 21 are first displaced, starting from the position of rest or of coupling of the guide shaft 27 in accordance with FIG. 1, from their respective parking positions into their respective outer loading positions and the guide shaft 27 is then manually traveled against the preload of the spring 43 out of its position shown in FIG. 1 into the position that is shown in FIG. 2 and in which the evaporator flask is then placed onto the flask support 11. The guide shaft 27 is subsequently again automatically pressed back into its coupling position by the preload of the spring 43 (cf. FIG. 3) in which the evaporator flask can then be mounted to the rotary drive. It is in principle also possible that the guide shaft 27 is first displaced out of the position shown in FIG. 1 into the position shown in FIG. 2 and that the loading positions of the cross members 19, 21 are only set thereafter.

Figure 3:
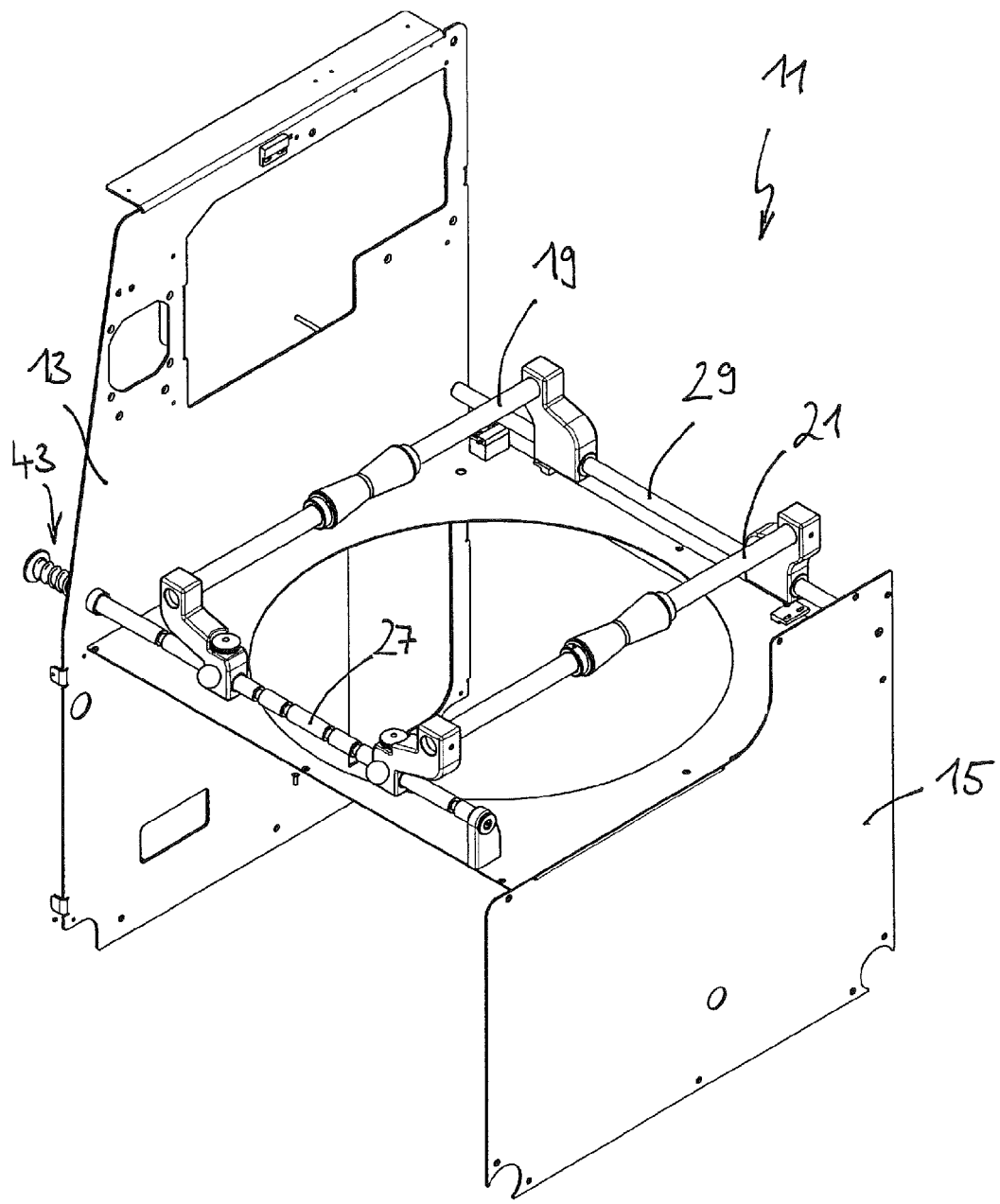
FIG. 3 the flask support of FIG. 1, with the cross members being latched in a second loading position.

To remove the evaporator flask from the rotary evaporator, the guide shaft 27 is displaced, after the respective fastening mechanism between the evaporator flask and the rotary drive has been released, out of the position shown in FIG. 3 into the position that is shown in FIG. 2 and in which the evaporator flask is then removed from the flask support 11.

It is understood that the positions shown in FIGS. 1 to 3 are maximum positions between which the guide shaft 27 is displaceable. To couple or decouple an evaporator flask to or from the rotary drive, the guide shaft 27 does not necessarily have to be completely displaced up to and into the coupling position. In an analog manner, a displacement completely up to and into the loading position is not necessarily required to place or remove the evaporator flask onto or from the flask support 11.

Figure 4:
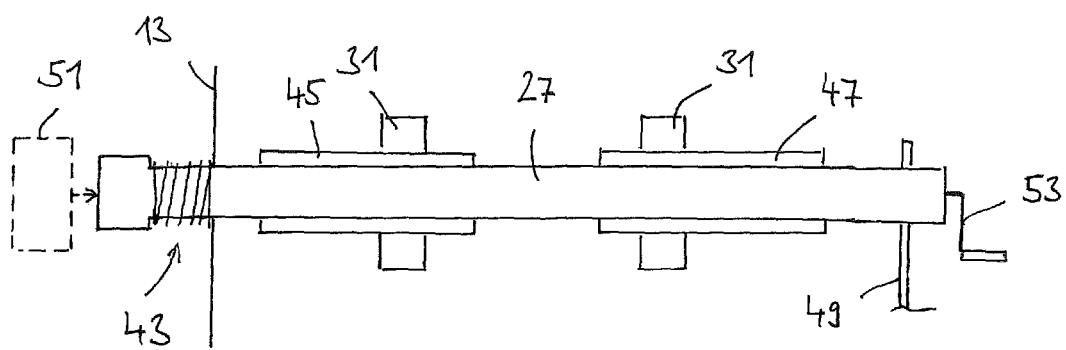
FIG. 4 a schematic side view of a guide element of a flask support in accordance with the invention in accordance with a further embodiment.

In an alternative embodiment in accordance with FIG. 4, the displacement of the two cross members 19, 21 or the adjustment of the spacing of the two cross members 19, 21 with respect to one another takes place by a spindle drive. In this respect, the guide element 27 is configured as a threaded spindle that is provided in the region of the first cross member 19 with a right hand or left hand thread 45 only shown schematically and in the region of the second cross member 21 with a thread 47 running opposite thereto only shown schematically. The two carriages 31 have a respective mating thread such that, on a rotation of the threaded spindle 27, for example by an internally arranged motor 51 or by a hand crank 53, the two cross members 19, 21 move toward or away from one another.

The fastening of an evaporator flask to the rotary drive of a rotary evaporator can therefore be designed as very simplified and user friendly by the above-described flask support.

REFERENCE NUMERAL LIST 11 flask support
13 side wall
15 side wall
17 plate
19 cross-member
21 cross-member
23 longitudinal direction
25 linear guide
27 guide element
29 guide element
31 carriage
33 carriage
35 support roller
37 support roller
38 annular groove
39 annular groove
41 latching device
43 spring
45 thread
47 mating thread
49 bearing block
51 motor
53 hand crank

The invention claimed is:

1. A rotary evaporator having:
a rotary drive; and
a flask support for an evaporator flask couple-able to the rotary drive,
wherein the flask support comprises two cross members for supporting the evaporator flask at two mutually spaced apart support regions and a longitudinal guide that has a guide element, with the two cross members being arranged at the guide element in a travelable manner to vary the mutual spacing of the two cross members;
wherein the guide element is displaceably guided in the longitudinal direction to displace the evaporator flask between a coupling position with the rotary drive and a position set back from the rotary drive; and
wherein the guide element is preloaded in the direction of the coupling position of the evaporator flask by means of a spring device.

2. The rotary evaporator in accordance with claim 1, wherein the guide element is slidingly guided and/or is displaceably guided only in a horizontal direction.

3. The rotary evaporator in accordance with claim 1, wherein the guide element is displaceable by a displacement distance of at least 20 mm.

4. The rotary evaporator in accordance with claim 1, wherein the two cross members can be fixed at the guide element of the longitudinal guide by means of a respective fixing device.

5. The rotary evaporator in accordance with claim 4, wherein the two cross members can be fixed at the guide element by a guide shaft.

6. The rotary evaporator in accordance with claim 4, wherein the respective fixing device is configured as a latching device and the two cross members are each latchable to the guide element at least two different latch positions.

7. The rotary evaporator in accordance with claim 6, wherein a latch groove is provided at the guide element to latch the respective cross member to the guide element at the respective latch position and a movable latch projection associated with the respective cross member and movable between a position securing the latched connection and a position releasing the latched connection engages into said latch groove.

8. The rotary evaporator in accordance with claim 7, wherein the respective latch projection is preloaded into the position securing the latched connection and/or is manually movable into the position releasing the latched connection via a respective actuation section accessible to a user.

9. The rotary evaporator in accordance with claim 1, wherein the traveling of the two cross members takes place by means of a helical gear transmission.

10. The rotary evaporator in accordance with claim 9, wherein the guide element is configured as a threaded spindle having a first threaded section with a left hand thread or a right hand thread and having a second threaded section with a thread running opposite thereto, wherein the first cross member is displaceably and rotationally fixedly supported on the first threaded section via a corresponding first mating thread and the second cross member is displaceably and rotationally fixedly supported on the second threaded section via a corresponding second mating thread.

11. The rotary evaporator in accordance with claim 1, wherein the longitudinal guide comprises, in addition to the displaceably guided guide element, at least one further guide element extending in parallel therewith and arranged at a fixed location.

12. The rotary evaporator in accordance with claim 11, wherein each of the two cross members is provided at its two ends with a respective carriage, with the respective cross member being arranged in a travelable manner at the two guide elements via the two carriages.

13. The rotary evaporator in accordance with claim 11, wherein the guide elements are configured as round bars.

14. The rotary evaporator in accordance with claim 12, wherein the carriages are provided with cylindrical passages of counter-shape to the round bars.

15. The rotary evaporator in accordance with claim 1, wherein a respective support element for the evaporator flask is attached to the two cross members.

16. The rotary evaporator in accordance with claim 15, wherein the respective support element has a double conical shape.

17. The rotary evaporator in accordance with claim 1, wherein the flask support has a substructure that bears the longitudinal guide.

18. The rotary evaporator in accordance with claim 17, wherein a heating bath is provided that is arranged beneath the flask support in the sub structure.

19. A flask support for an evaporator flask couplable to a rotary drive of a rotary evaporator that comprises two cross members for supporting the evaporator flask at two mutually spaced apart support regions and a longitudinal guide that has a guide element and at which the two cross members are arranged in a travelable manner to vary the mutual spacing of the two cross members, with the guide element being displaceably guided in the longitudinal direction to displace the evaporator flask between a coupling position with the rotary drive and a position set back from the rotary drive, wherein the guide element is preloaded in the direction of the coupling position of the evaporator flask by means of a spring device.

\* \* \* \* \*